(12) United States Patent
Chiang (10) Patent No.: US 7,845,261 B2
(45) Date of Patent: Dec. 7, 2010

(54) BLADE SEAT STRUCTURE FOR PAPER CUTTER

(76) Inventor: Tung-Lung Chiang, No. 20, Min Sheng Rd., Tou Liu City, Yu Lin Hsien (TW)

( * ) Notice: Subject to any disclaimer, the term of this patent is extended or adjusted under 35 U.S.C. 154(b) by 474 days.

(21) Appl. No.: 11/942,197

(22) Filed: Nov. 19, 2007

(65) Prior Publication Data

US 2009/0126546 A1 May 21, 2009

(51) Int. Cl.
*B26D 5/08* (2006.01)
*B26D 7/02* (2006.01)

(52) U.S. Cl. .............................. 83/614; 83/455; 83/459
(58) Field of Classification Search .................. 83/614, 83/455, 459
See application file for complete search history.

(56) References Cited

U.S. PATENT DOCUMENTS

| 5,671,647 | A | * | 9/1997 | Mori | 83/56 |
| 6,931,974 | B2 | * | 8/2005 | Tseng | 83/699.11 |
| 6,966,247 | B2 | * | 11/2005 | Tseng | 83/455 |
| 7,044,042 | B2 | * | 5/2006 | Schultz et al. | 83/552 |
| 2006/0117925 | A9 | * | 6/2006 | Volfson et al. | 83/485 |
| 2006/0156885 | A1 | * | 7/2006 | Wu | 83/485 |
| 2006/0207401 | A1 | * | 9/2006 | Wu | 83/614 |
| 2006/0266191 | A1 | * | 11/2006 | Shih | 83/614 |

* cited by examiner

*Primary Examiner*—Ghassem Alie
*Assistant Examiner*—Bharat C Patel
(74) *Attorney, Agent, or Firm*—Rosenberg, Klein & Lee (57) ABSTRACT

A blade seat structure for a paper cutter includes a base, a sliding seat, an engaging block and a cover. The base includes an arcuate slot and a longitudinal hole. The sliding seat is located in a trough of the base. The sliding seat is provided with a plurality of blades and a first post sliding along the slot to facilitate exchange of the blades. A second post is provided on the engaging block. The second post moves within the longitudinal hole and engages with a recess section of the sliding seat. The cover is provided with a block to press the engaging block to secure the sliding seat firmly for cutting paper.

4 Claims, 10 Drawing Sheets

BLADE SEAT STRUCTURE FOR PAPER CUTTER

BACKGROUND OF THE INVENTION

1. Field of the Invention

The present invention relates to a blade seat structure for a paper cutter, and more particularly to a sliding seat disposed in a base in a sliding manner along with a cover and an engaging block to secure the sliding seat in order to exchange blades and to cut paper firmly.

2. Description of the Prior Art

Figure 8:
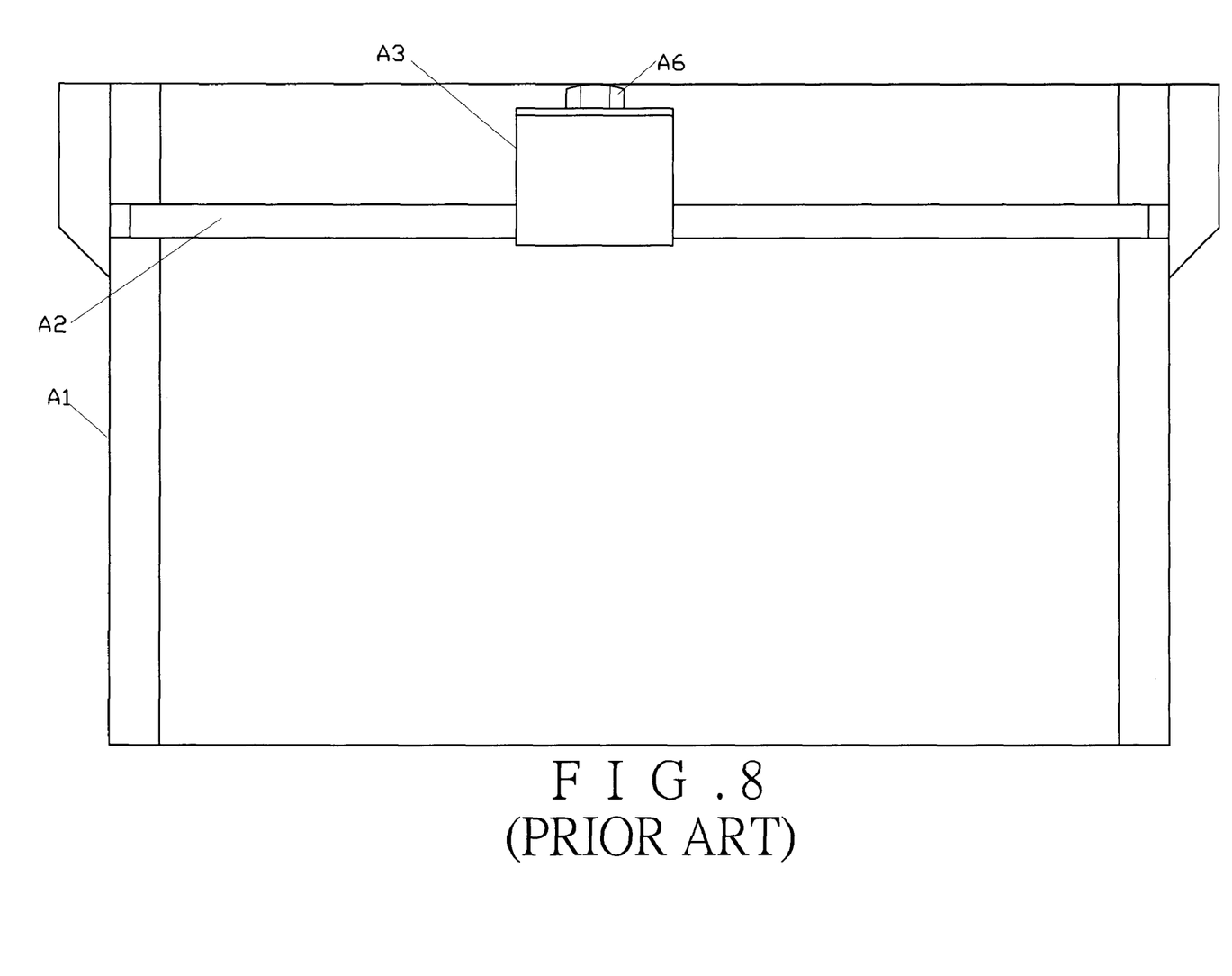
FIG. 8 is a top view of the prior art.
Figure 9:
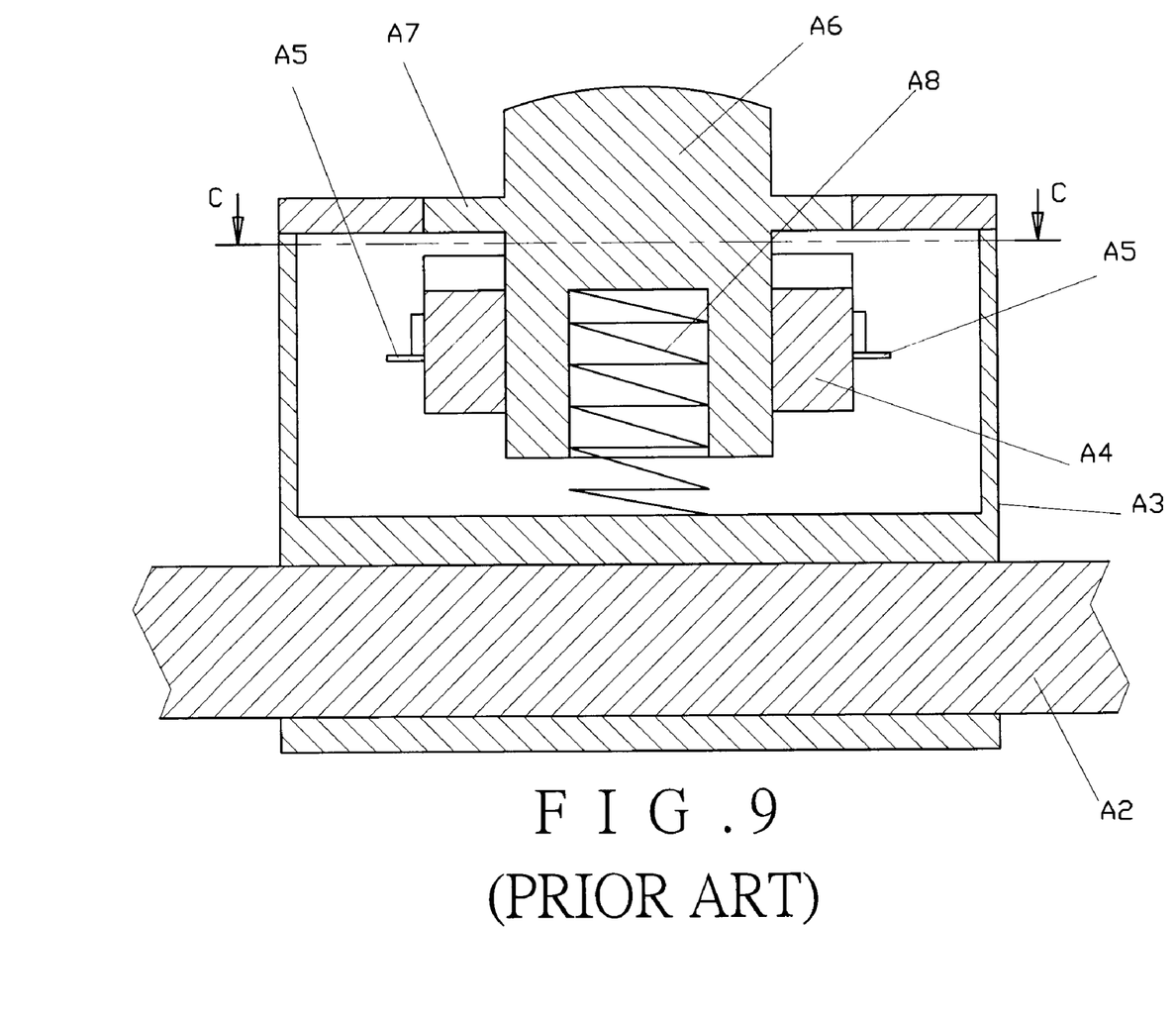
FIG. 9 is a cross-sectional view of the prior art.
Figure 10:
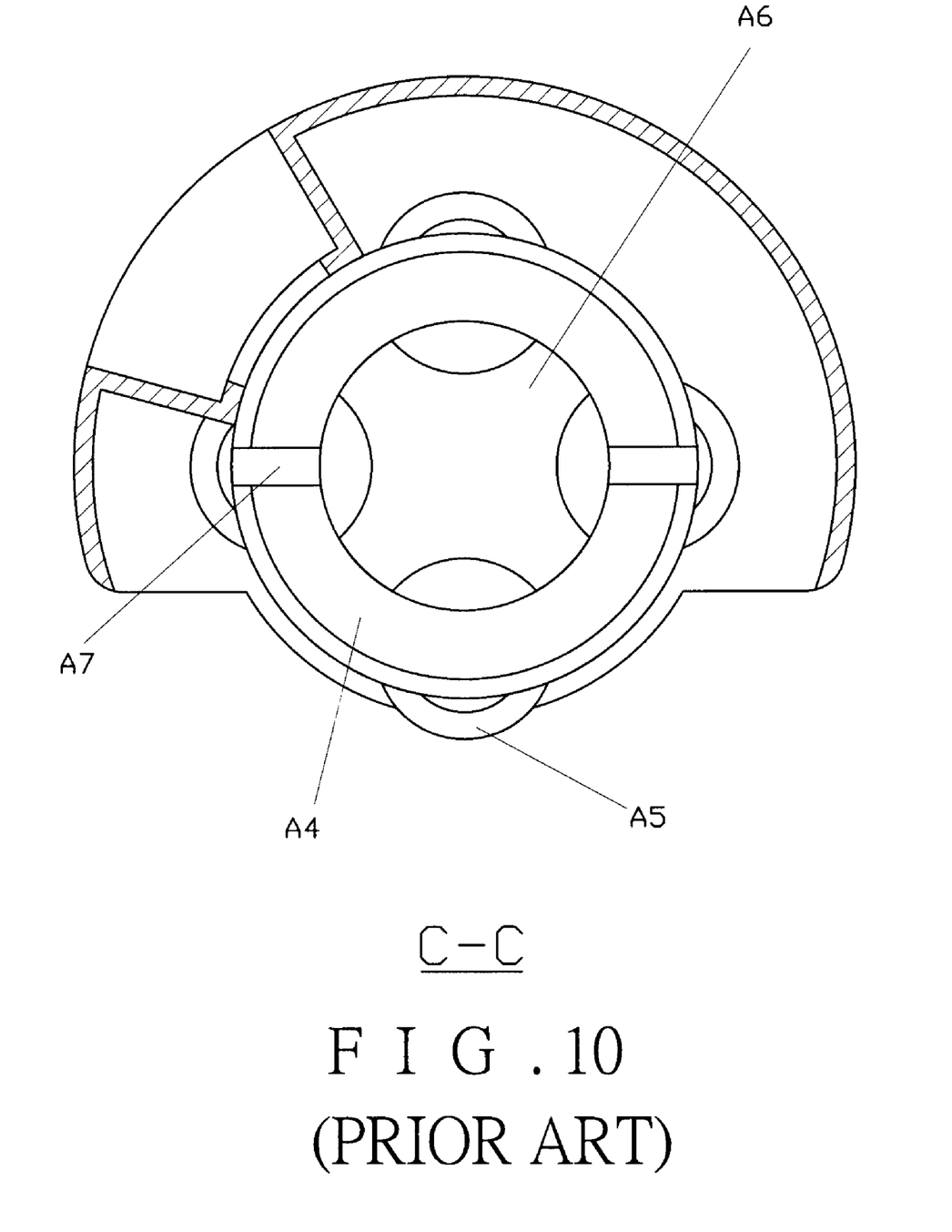
FIG. 10 is another cross-sectional view of the prior art.

A conventional paper cutter, as shown in FIGS. 8 through 10, comprises a base A1 and a rail A2 for a sliding block A3 to slide thereon. A blade seat A4 is pivotally connected to the sliding block A3. The rotating axle of the blade seat A4 is perpendicular to the rail A2. The blade seat A4 comprises at least two blades A5. The sliding block A3 comprises a knob A6 which links to a tenon A7. The tenon A7 is urged by a spring A8 to engage with the sliding block A3.

To replace a desired blade A5, press and turn the knob A6 to detach the tenon A7 from the sliding block A3, and the blade seat A4 is linked to spin as well to change the blade A5.

To cut paper with the conventional cutter, the counterforce from the blade A5 is absorbed by the tenon A7, thus the accuracy of the blades A5 depends upon the tenon A7. Furthermore, the conventional cutter is inconvenient to change the blades A5.

SUMMARY OF THE INVENTION

Owing to the above shortcomings, the present invention provides a blade seat structure for a paper cutter comprising a base comprising a channel and a trough, arcuate slots, longitudinal holes and securing sections being provided on front and rear walls of said base, a resilient strip being provided on said securing sections, and said base further having a first opening and a second opening; a sliding seat disposed in said trough of said base in a sliding manner, said sliding seat comprising an engaging end and an arcuate cutting end, said engaging end having at least one recess section, at least one blade being provided on said cutting end, the edge of said blade extending outward from said cutting end of said sliding seat and said second opening of said base, a first post being provided on the axle of said blade, said first post extending into said slot of said base; an engaging block subject to said resilient strip disposed in said trough of said base and engaged with said recess section of said sliding seat, said engaging block comprising a second post extending into said longitudinal hole of said base; and a cover pivoted to said base comprising a block corresponding in position to said first opening of said base.

Preferably, said base has a through hole at the bottom of said base to accommodate a spring and a bead therein, said bead having a portion protruding outward from said through hole.

Preferably, said first post is provided with a pushing key protruding outward from said slot of said base.

Preferably, a pressing block is provided in said channel of said base.

It is the primary object of the present invention to provide a blade seat structure for a paper cutter, which provides a sliding seat sliding along an arcuate slot to facilitate replacing blades.

It is another object of the present invention to provide a blade seat structure for a paper cutter, which uses a block of a cover to press an engaging block so as to secure the sliding seat firmly.

It is a further object of the present invention to provide a blade seat structure for a paper cutter, which provides retractable beads at the bottom to facilitate sliding and pressing paper for cutting.

DETAILED DESCRIPTION OF THE PREFERRED EMBODIMENT

As shown in FIGS. 1, 2, 3 and 4, a preferred embodiment of the present invention comprises a base 1, a sliding seat 2, two engaging blocks 3 and a cover 4.

The base 1 has a through channel 11 to accommodate a rail A2 therein. A resilient pressing block 111 is provided in the channel 11. The base 1 further comprises a trough 12 therein. Arcuate slots 14, longitudinal holes 15 and securing sections 16 are provided on front and rear walls 13 of the base 1. A resilient strip 161 is provided on the securing sections 16. The base 1 has a first opening 17 at the top of the base 1 corresponding in position to the securing sections 16 and a second opening 18 at the bottom of the base 1. A pair of through holes 19 are formed on the bottom of the base 1. The through holes 19 are adapted to accommodate springs 191 and beads 192. Each of the beads 192 is urged by the spring 191 and has a portion protruding outward from the through hole 19.

The sliding seat 2 is disposed in the trough 12 in a sliding manner, and comprises a waved engaging end 21 at one side and an arcuate cutting end 23 and the other side opposing the engaging end 21. The engaging end 21 has a plurality of recess sections 22. A plurality of blades 24 in different shapes are provided on the cutting end 23. The blades 24 are protruding outward from the cutting end 23 of the sliding seat 2 and selectively from the second opening 18 of the base 1 as well. A respective first or axle post 25 is provided as the axle of each of the blades 24 to be inserted into the slots 14 of the base 1. A pushing key 26 is connected to the portion of the first post 25 that protrudes outwardly from one of the slots 14.

The two engaging blocks 3 are located in the trough 12 of the base 1. A pair of second or fixed posts 31 is provided at respective sides of the engaging blocks 3. The second posts 31 are inserted into the longitudinal holes 15 of the base 1. The engaging blocks 3 are urged by the resilient strips 161 within the base 1 to engage with two of the recess sections 22 of the sliding seat 2.

The cover 4 is pivotally connected to the base 1, and comprises a pair of blocks 41 at an inner side thereof, corresponding in position to the first opening 17 of the base 1. The blocks 41 extend into the first opening 17 and are adapted to press the engaging blocks 3 to restrain random movement.

Figure 4:
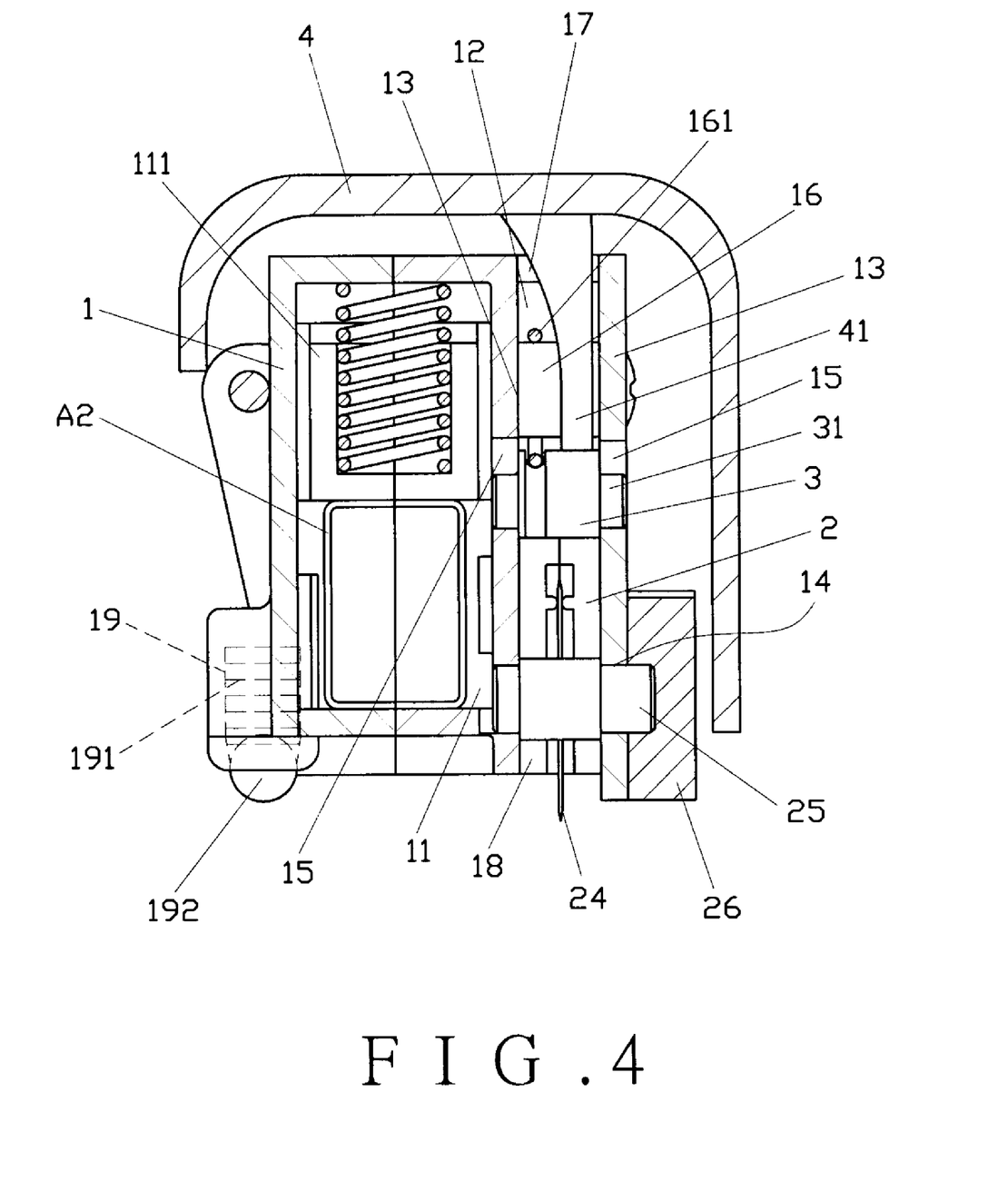
FIG. 4 is a side cross-sectional view of the present invention.
Figure 5:
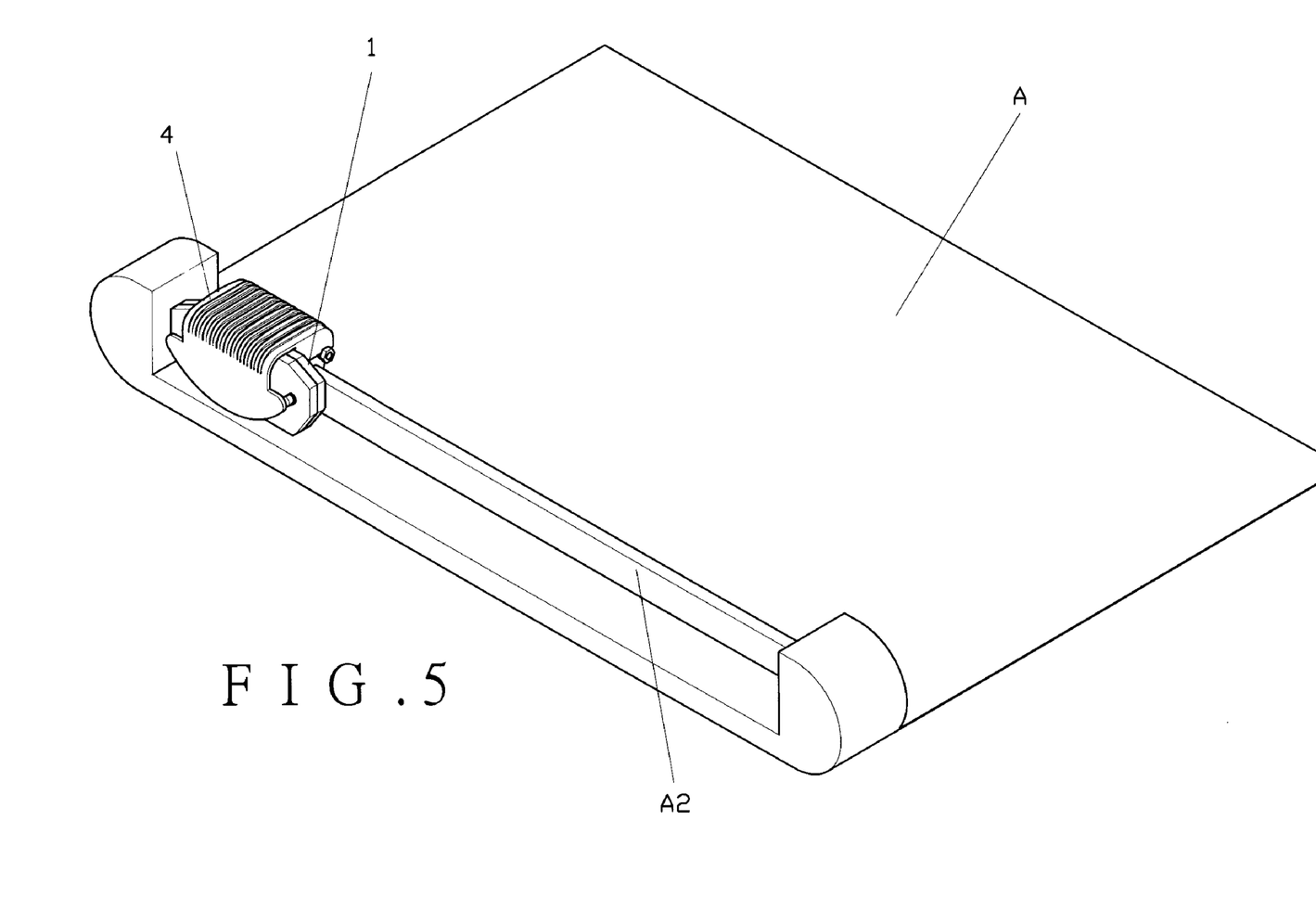
FIG. 5 is a perspective view showing the present invention mounted on a rail of a paper cutter.

To operate the present invention, as shown in FIGS. 4 and 5, the base 1 is mounted to the rail A2 of a paper cutter A. The rail A2 is inserted through the channel 11 of the base 1 and is clamped by the pressing block 111, so that the base 1 may slide along the rail A2 smoothly while the blades 24 on the sliding seat 2 are cutting the paper. The beads 192 protruding from the through holes 19 facilitate sliding of the base 1 and pressing paper for cutting.

Figure 1:
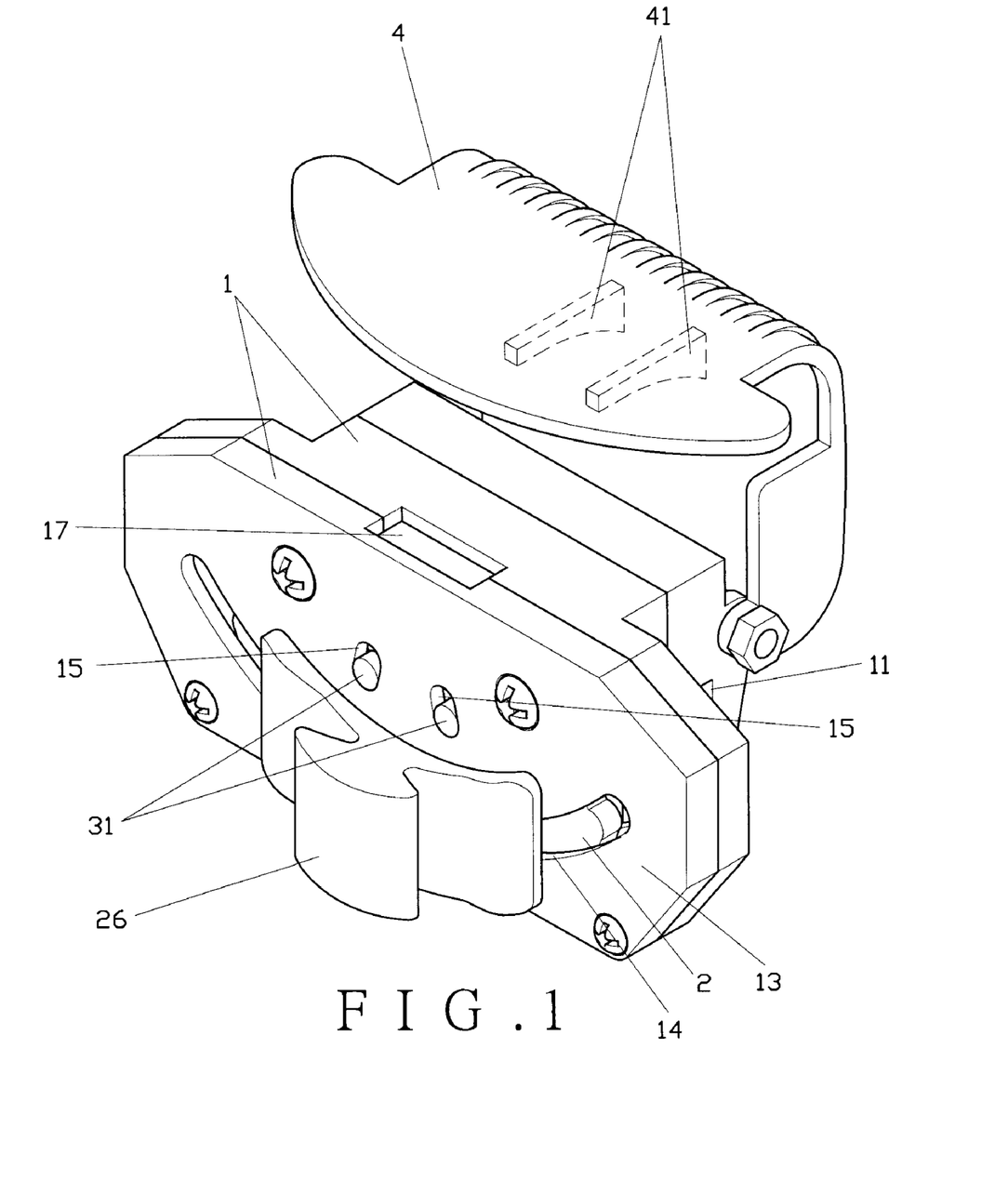
FIG. 1 is a perspective view of the present invention.
Figure 2:
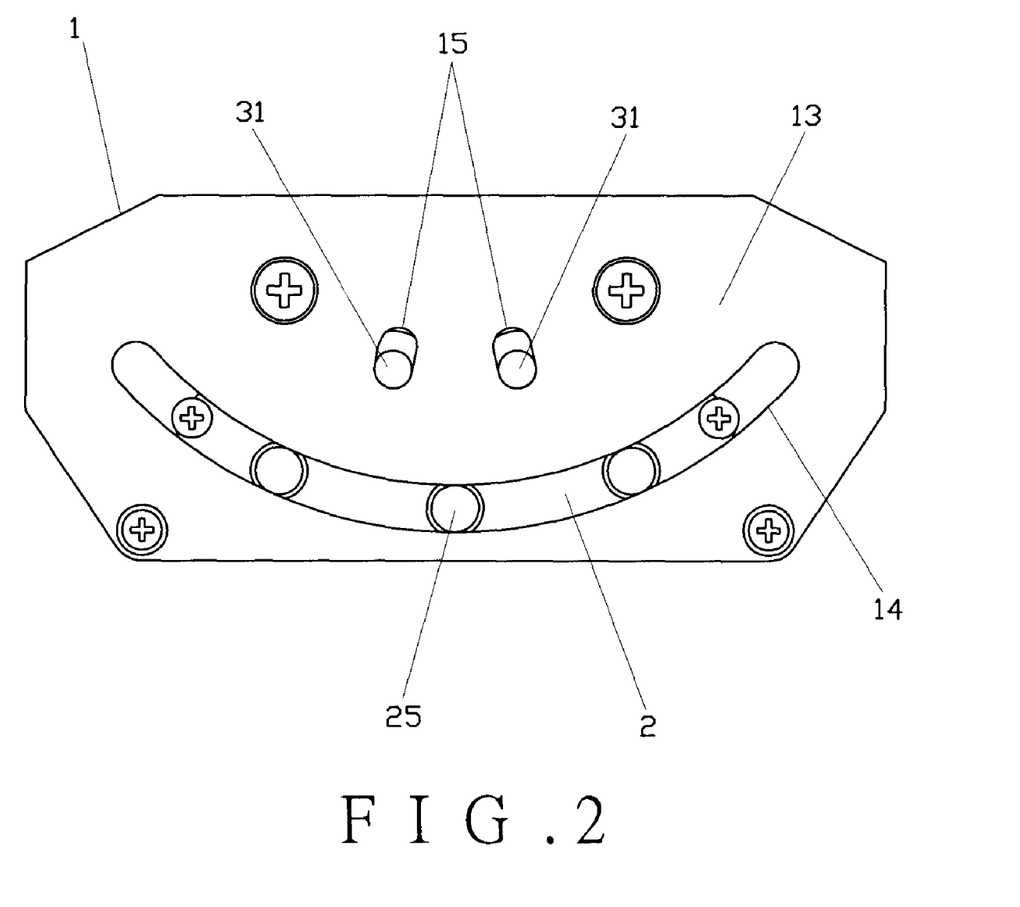
FIG. 2 is a front cross-sectional view of the present invention.
Figure 3:
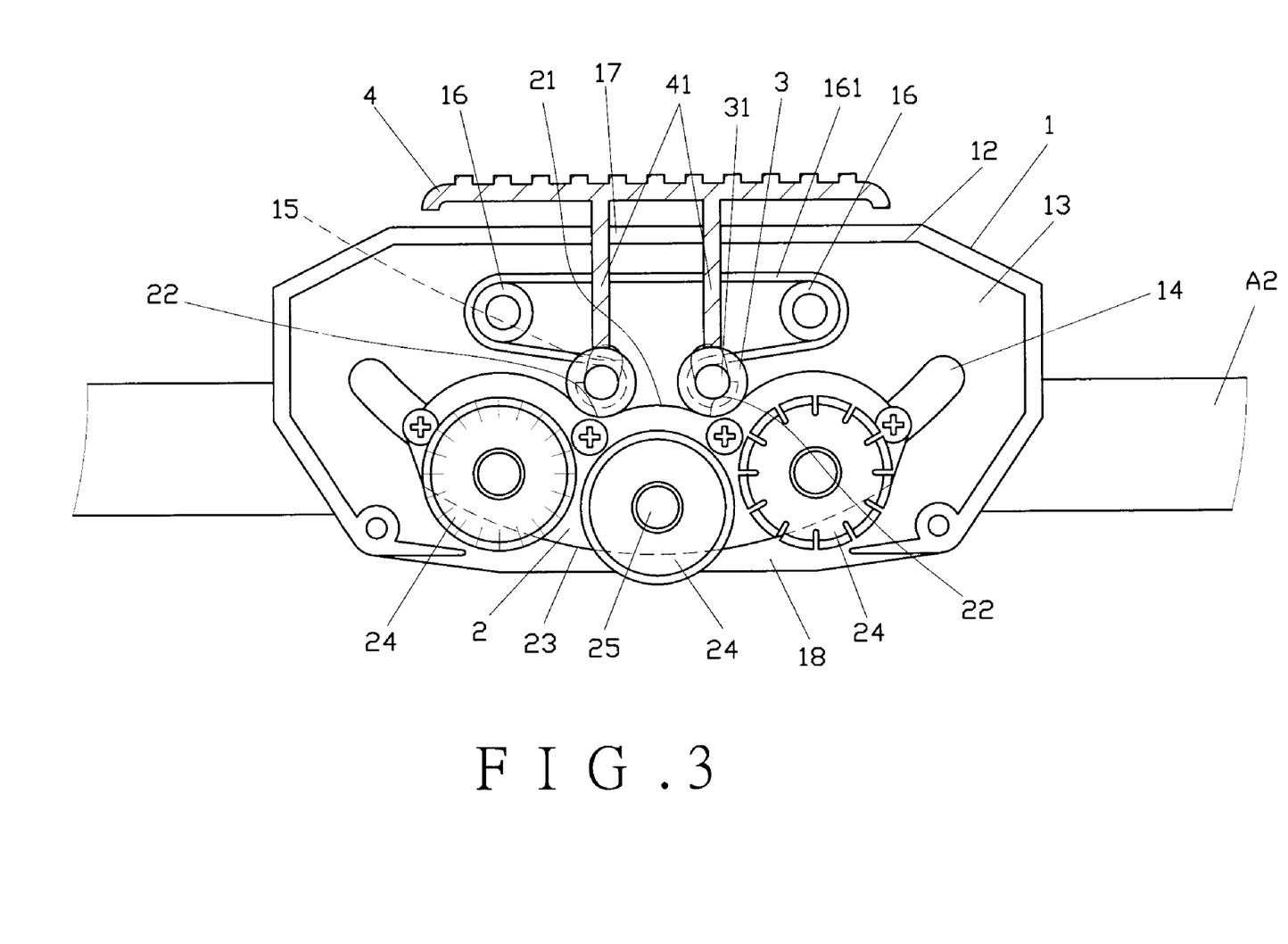
FIG. 3 is a cross-sectional view of the present invention showing engaging blocks engaging with recess sections of a sliding seat.
Figure 6:
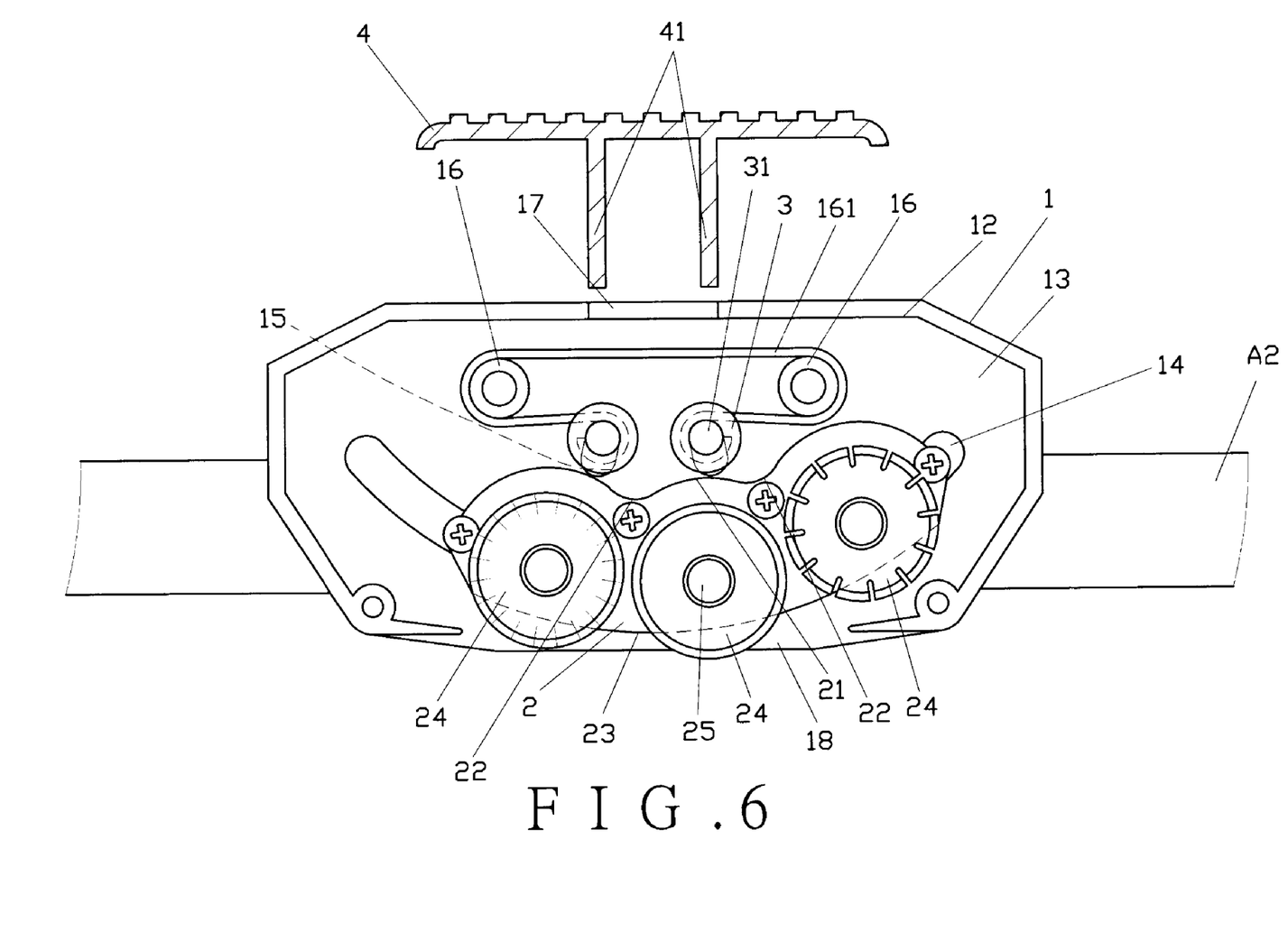
FIG. 6 is a cross-sectional view showing the sliding seat sliding in a trough.
Figure 7:
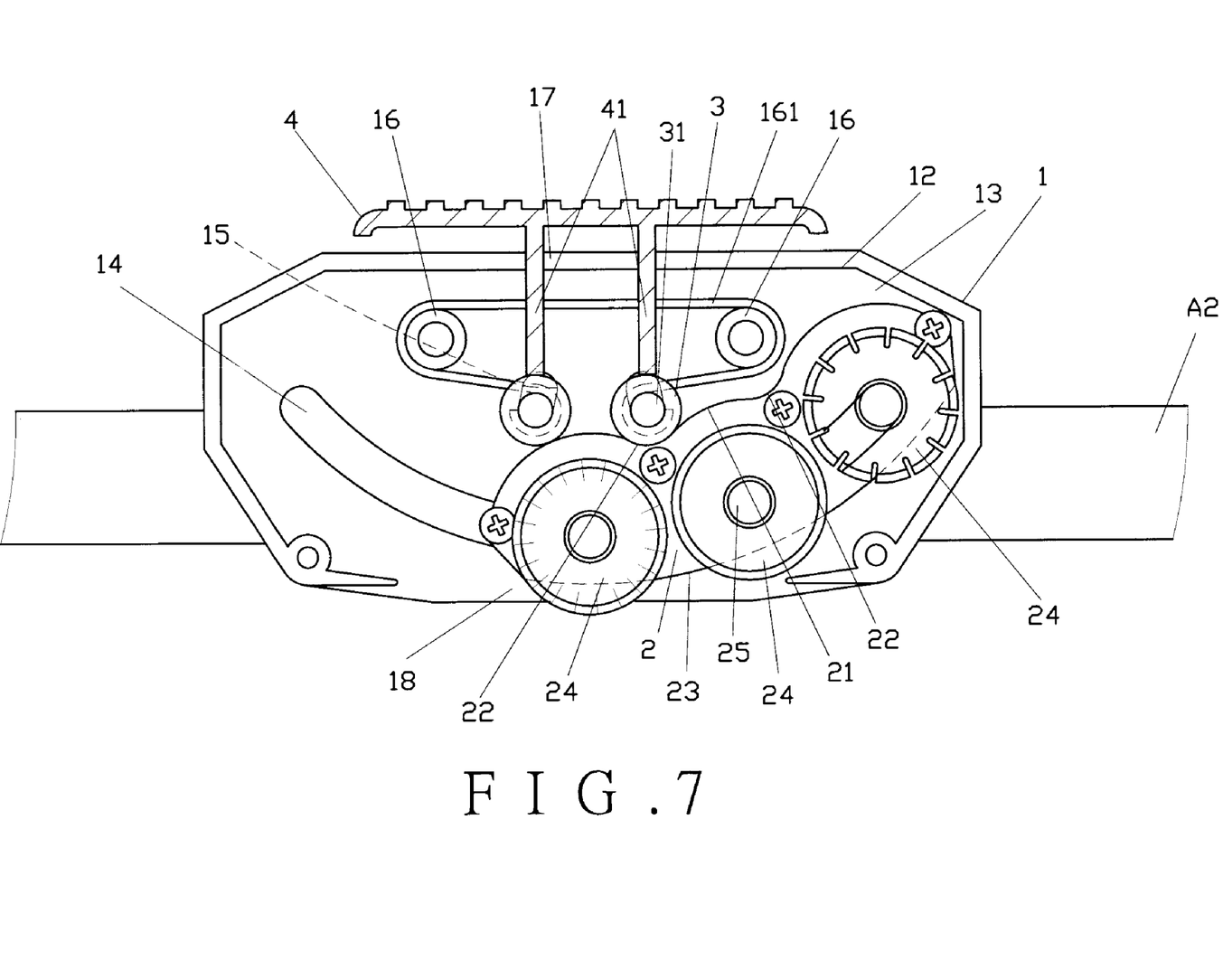
FIG. 7 is a cross-sectional view showing the engaging blocks engaging with another two recess sections of said sliding seat.

To replace the blades 24, as shown in FIG. 6, open the cover 4 so that the blocks 41 retreat from the first opening 17 of the base 1 and disengage with the engaged blocks 3. The pushing key 26 of the sliding seat 2 (as shown in FIG. 1) is pressed to link the sliding seat 2 through the first post 25 to slide along the slot 14 of the base 1. When the first post 25 of the sliding seat 2 slide along the arcuate slot 14, the engaging blocks 3 will disengage from the recess sections 22 of the sliding seat 2 and be pushed by the engaging end 21 to move upward so that the second posts 31 of the engaging blocks 3 move upwardly along the longitudinal holes 15 and urge the resilient strips 161 until a desired blade 24 protruding outward from the cutting end 23 of the sliding set 2 and relative recess sections 22 aligning with the engaging blocks 3, as shown in FIG. 7. The engaging blocks 3 are urged by the resilient strips 161 to engage with the relative recess sections 22. The base 1 is covered with the cover 4. The blocks 41 extend into the first opening 17 and engage with the engaging blocks 3 so that the sliding seat 2 is confined from moving randomly.

What is claimed is:

1. A paper cutter blade seat structure comprising:

a base comprising a channel and a trough, an arcuate slot and a plurality of longitudinal holes being respectively provided in front and rear walls of said base, and a plurality of securing sections being provided between said front and rear walls, a resilient strip being provided on said securing sections, and said base further having a first opening and a second opening;

a sliding seat disposed in said trough of said base in a sliding manner, said sliding seat comprising an engaging end and an arcuate cutting end, said engaging end having a plurality of recess sections, a plurality of blades being provided on said cutting end, the edge of one of said plurality of blades being selectively extended outward from said cutting end of said sliding seat and said second opening of said base, a respective axle post being provided as an axle of each of said plurality of blades, each said axle post extends into said slots of said base;

a plurality of engaging blocks subject to said resilient strip disposed in said trough of said base and respectively engaged with said plurality of recess sections of said sliding seat, each of said plurality of engaging blocks comprising a fixed post extending into a corresponding one of said plurality of longitudinal holes of said base; and a cover pivoted to said base comprising a plurality of blocks corresponding in position to said first opening of said base.

2. The paper cutter blade seat structure for a paper cutter, as recited in claim 1, wherein said base has a through hole at the bottom of said base to accommodate a spring and a bead therein, said bead having a portion protruding outward from said through hole.

3. The paper cutter blade seat structure for a paper cutter, as recited in claim 1, wherein said axle posts protrude through said arcuate slot in one of said front and rear walls of said base for coupling with a pushing key.

4. The paper cutter blade seat structure for a paper cutter, as recited in claim 1, wherein a pressing block is provided in said channel of said base.

\* \* \* \* \*